US005355574A

United States Patent [19]

Zweekly et al.

[11] Patent Number: 5,355,574

[45] Date of Patent: Oct. 18, 1994

[54] BEARING CHANGER

[75] Inventors: Raymond T. Zweekly, Royal Oak; Jeffrey A. Zweekly, Troy, both of Mich.

[73] Assignee: Inventive Fabrications, Inc., Royal Oak, Mich.

[21] Appl. No.: 107,910

[22] Filed: Aug. 18, 1993

Related U.S. Application Data

[63] Continuation of Ser. No. 6,988, Jan. 21, 1993, abandoned.

[51] Int. Cl.$^5$ .............................................. B23P 19/04

[52] U.S. Cl. .......................................... 29/262; 29/263

[58] Field of Search .................. 29/262, 263, 264, 265

[56] References Cited

U.S. PATENT DOCUMENTS

| | | | |
|---|---|---|---|
| 1,177,843 | 4/1916 | Ackerman et al. | 29/263 |
| 3,611,540 | 10/1971 | Gibu | 29/263 |
| 4,507,837 | 4/1985 | Hinkle | 29/262 |
| 4,724,608 | 2/1988 | Parrott | 29/263 |
| 4,852,235 | 8/1989 | Trease et al. | 29/263 |
| 4,916,792 | 4/1990 | Haubus | 29/263 |

*Primary Examiner*—Robert C. Watson
*Attorney, Agent, or Firm*—Dinnin & Dunn

[57] ABSTRACT

Tool for installing and removing anti-friction skate wheel bearings press fit in plastic skate wheels. A tubular shouldered split end passing through the inner race provides bearing engagement when spread by retraction of a conically headed rod projecting beyond the split end. A threaded end of the rod projecting beyond tube is retracted by a threaded knob reacting against the end of the tube, and the tube with bearing is retracted by rotating knob fixed on the tube to feed a threaded portion of the tube through a threaded collar reacting against a side of the wheel. For installing a bearing, it is retracted into a press fit cavity in the skate wheel; and for removing the bearing it is oppositely retracted by the same split end tube extension when spread by the conically headed rod and rotated in the collar.

10 Claims, 2 Drawing Sheets

BEARING CHANGER

This application is a continuation of previously copending application, Ser. No.: 08/006,988 filed on Jan. 21, 1993, abandoned upon the filing of this continuation application.

BACKGROUND OF THE INVENTION

Anti-friction wheel bearings such as used in roller skates are press fit in wheel cavities typically in molded plastic wheels. Such wheels wear out before the bearings, which may be removed and reinstalled in new wheels a number of times. Cylindrical cavity recesses may include an internal shoulder to accommodate bearing insertion from either side with a through opening providing full clearance for the inner race. With the bearing seated against the shoulder in a relatively wide wheel, the shoulder may be offset from the center to locate the bearing near one side or alternatively close to the center; or in some cases, a pair of bearings may be installed from either side.

It is known in the art to provide a bearing removal tool, having a pull rod which may be inserted through the inner race of a seated bearing with a laterally offset tang on the end of the pull rod able to engage one side of the inner bearing race. A threaded collar engaging a threaded bushing fixed on the pull rod reacts against one side of the wheel during rotation while holding a knob fixed on the rod pulling the bearing out of the wheel. The offset tang imposes an offset load on the inner race tending to cock the bearing as it is withdrawn from the bearing seat.

To install a bearing with such tool, an oppositely threaded end of the pull rod is inserted through the bearing and a separate threaded sleeve with a cross pin is turned against the bearing while holding the knob.

BRIEF DESCRIPTION OF THE PRESENT INVENTION

A threaded tube having a reduced split tube extension with an end shoulder small enough to pass through a bearing inner race in a free state is expandable to exceed the ID of and engage the inner race for extraction. A rod with a conical head extends through the tube and tube extension with means provided for pulling the red with its conical head to expand the split end of the tube for shoulder engagement of the inner race for extracting the bearing when the threaded tube is withdrawn through a threaded knurled collar reacting against the side of the wheel while the tube is rotated by a knob fixed on its other end.

Installation of the bearing is accomplished by passing the tube extension through the wheel and loose bearing, expanding the shoulder end for inner race engagement, and again withdrawing the tube to pull the bearing into its press fit pocket seat.

Accordingly, the components of the bearing changer, in addition to the threaded tube, include a threaded collar engaging the threaded tube for reaction against the wheel side, a knurled knob fixed to one end of the threaded tube for manual rotation of the tube, and a small knurled knob engaging a threaded end of the rod extending beyond the end of the threaded tube and adapted to react against the end of the threaded tube in retracting the rod to spread the split shouldered end of the tube.

DETAILED DESCRIPTION OF PREFERRED EMBODIMENT

Figure 1:
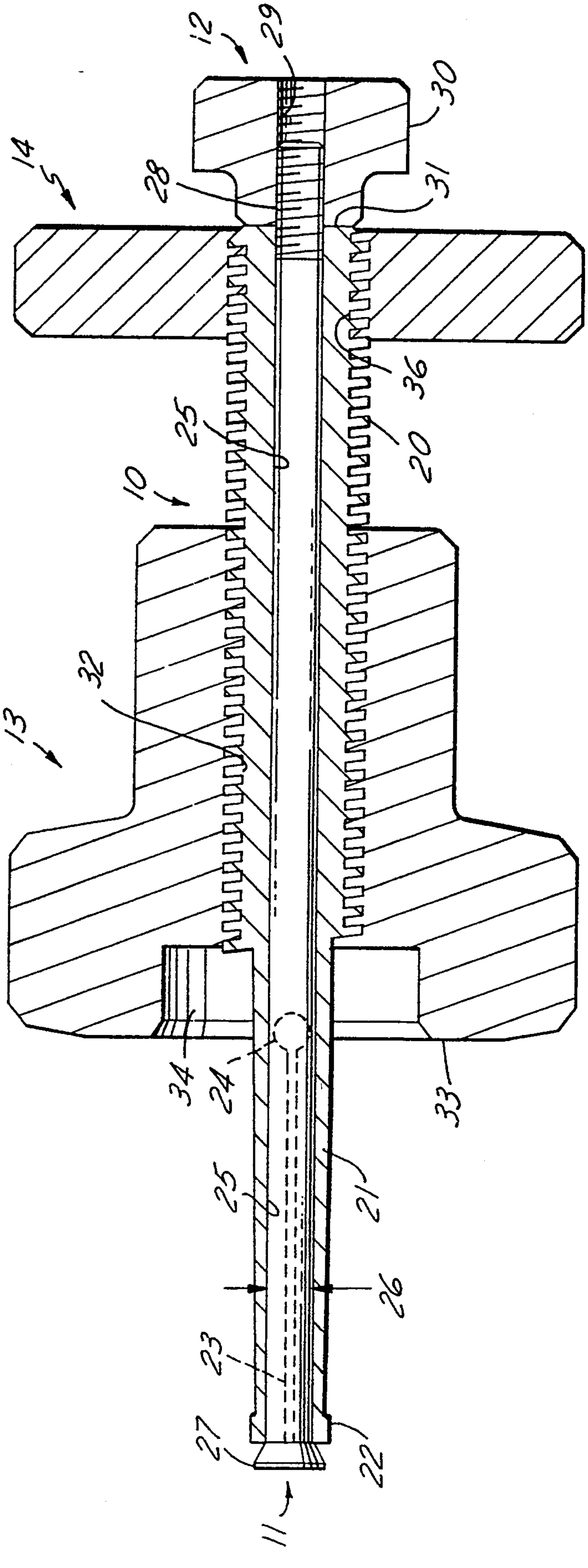
FIG. 1 is a double scale sectional side elevation of the subject bearing changer assembly.
Figure 4:
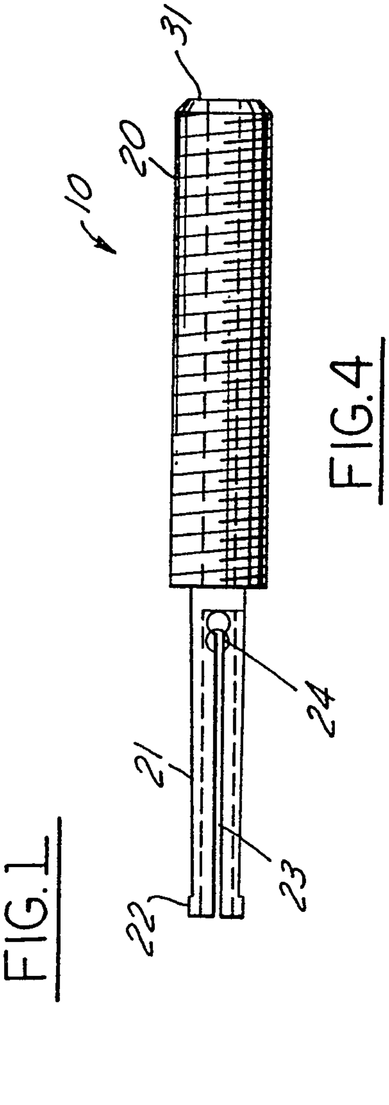
FIG. 4 is a side elevation of the threaded tube per se illustrated in the assembly view of FIG. 1.

With reference to FIG. 1, threaded tube 10 is provided with external thread 20, reduced unthreaded extension 21 having shoulder 22, split 23 terminating in cross hole 24, and through hole 25.

Rod 11 has diameter 26 for free clearance passage through hole 25, conical head 27 projecting beyond split end 21 of threaded tube 10, and threaded end 28 projecting beyond the other end of threaded tube 10.

Figure 2:
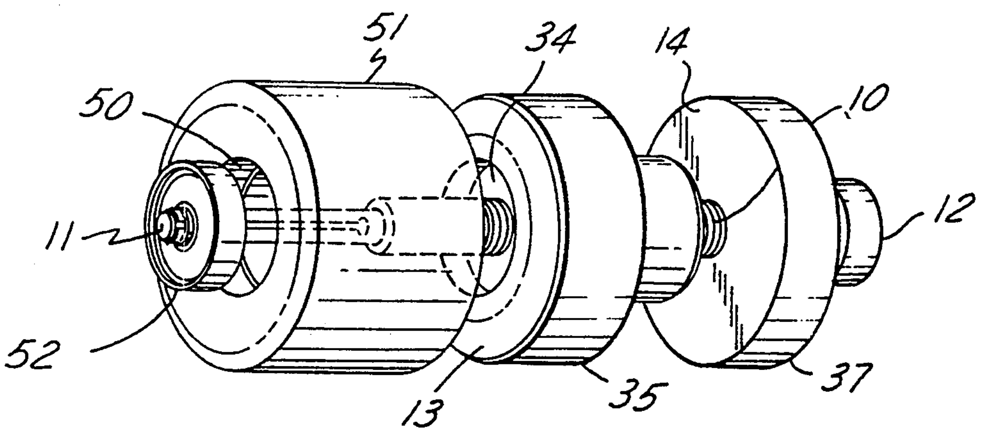
FIG. 2 is a perspective view illustrating bearing installation.
Figure 3:
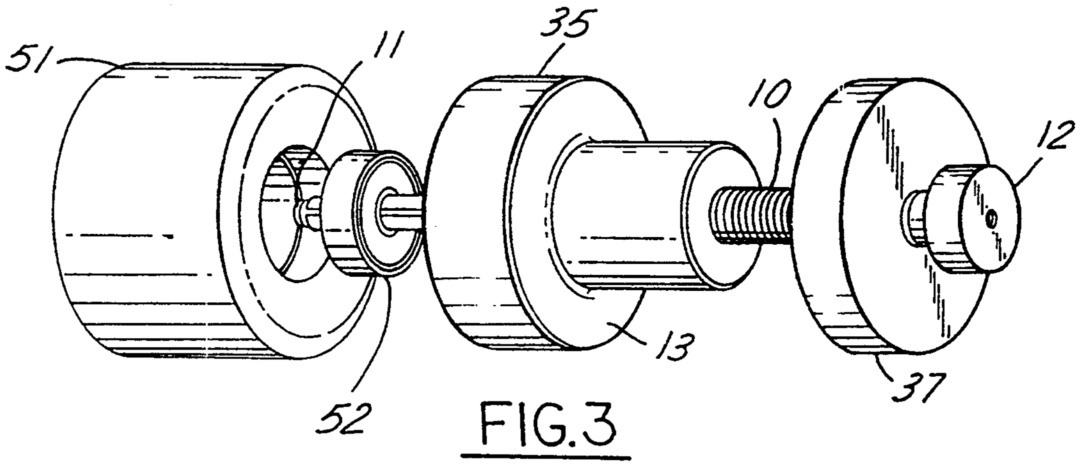
FIG. 3 is a perspective view illustrating bearing removal.

With reference to FIGS. 1, 2, and 3, knob 12 is provided with through threaded hole 29, for engaging thread 28 of rod 11, and knurled surface 30, for manual rotation against end 31 of tube 10 to pull rod 11 and its conical head 27 for spreading split extension 21 and shoulder 22 for retraction engagement of the inner race of a wheel bearing 50.

Collar 13 is provided with internal thread 32, for engaging tube thread 20, and face 33 for engaging either side of molded plastic skate wheel 51. Cavity 34 is provided to accommodate with circumferential clearance a wheel bearing 50 retracted from a skate wheel 51 as hereinafter described. A knurled surface 35 is provided to facilitate manual holding.

Knob 14 is provided with internal thread 36 for engagement and fixed attachment to the end of tube 10, as by Loctite bonding or otherwise, and knurled surface 37 to facilitate manual turning of threaded tube 10 while holding collar 13.

To remove bearing 50 from skate wheel 51, threaded tube 10 is rotated through collar 13, in registration with the side of the skate wheel, until extension 21 with shoulder 22 extend just beyond the inner bearing race; while then holding knob 14, knob 12 is rotated into engagement with tube end 31 and further rotated to retract conical head 27 into spreading engagement with split extension 21 so that shoulder 22 will engage the inner bearing race upon retraction off threaded tube 10. Such retraction is accomplished by holding collar 13 while rotating knob 14 in an extraction direction. Upon complete removal, the bearing will be received in cavity 34 of collar 13. Knob 12 is then rotated out of engagement with tube end 31 and, if necessary, pushed toward such tube end to release conical rod end 27 from its spreading engagement with split extension 21, thereby providing for release of bearing 50 from the tool.

To effect installation of bearing 50, collar 13 is rotated backwardly toward knob 14 sufficiently to permit extension of split end 21 through wheel 51 and a loose external bearing 50 to be installed. Tube 10 is then retracted with collar 13 engaging a side of the wheel until shoulder 22 approaches the bearing inner race while in proximity to wheel cavity 52, for expansion engagement by conical end 27 of retracting rod 11 through rotation of knob 12 against tube end 31. Tube 21 is then retracted with the bearing in alignment with its pocket seat by rotating knob 14 while holding collar 13 in registration with the wheel side to provide reaction for pulling the bearing into its pocket seat. Knob 12 is then rotated to release engagement with tube end 31 and pressed forward, if necessary, to release engagement of conical end 27 from tube end 21 and accommodate withdrawal of the tube from installed bearing 50 on wheel 51.

Split end 21 of tube 10 is critical with shoulder 22 adapted in its free state on rod 11 to pass through the smallest bearing inner race in general use for skate wheels or the like, having a 0.277 inch diameter, and expandable to provide shoulder engagement with the largest, having a diameter less than 0.358 inch. This is accomplished by providing a shoulder 22 outside diameter of 0.270/0.272 inch with a 0.015 radial step, corresponding to a conical taper in the tube end 21 of approximately 0.655°, combined with a rod end taper of 30° from a 0.250 head diameter to 0.162/0.165 rod diameter 26. Tube 10 is provided with a #19 drill through hole 25 equal to 0.166 inch diameter Accordingly, with five simple readily producable components, a tool for both installation and removal of wheel bearings has been provided which can be actuated with nominal force manual knob turning.

We claim:

1. A tool for extracting a bearing press fit in a wheel comprising; a tube having a threaded body and a split end for extending through an inner bearing race with shoulder means extending beyond the axial extremity of said bearing race expandable for axial engagement with the axial extremity of said race, a rod extending through said tube with a threaded end and a tapered opposite end for expanding said split end upon tensile retraction, threaded means engaging said threaded end and reacting against an end of said tube opposite said split end for retracting said rod to produce said expansion, and a collar, said collar having an axially extending, inwardly threaded bore therein, said threaded bore complementary with said threaded body of said tube such that rotation of said collar about said tube results in axial displacement of said collar, said collar further including a radially extending portion defining a face transverse said axially extending threaded bore, said collar further having a cylindrical cavity extending axially inward form said face, said cavity of a size sufficient to receive said bearing, wherein said face reacts directly against said wheel for retracting said tube with said split end shoulder means in axial retracting engagement with said race and bearing to effect extraction of said bearing from said wheel.

2. Tool of claim 1 including means for also installing a bearing to be press-fit in a wheel, said split end being of sufficient length to extend through the wheel and loose bearing to be installed, and including means for retracting said tube with said split end and bearing into said wheel.

3. Tool of claim 1 wherein said rod is provided with a threaded end engaged by a threaded knob reacting against the end of said tube to produce said rod retraction and split end expansion.

4. Tool of claim 1 wherein said tube has a threaded body with a reduced unthreaded split end having sufficient length for extension through a wheel and loose bearing prior to installation as well as through an installed bearing prior to extraction.

5. Tool of claim 1 including a threaded collar provided, upon rotation engagement by the thread of said tube, for reaction engagement with the side of a wheel.

6. Tool of claim 5 including a hand knob secured to said tube for producing feed rotation between said tube and said collar.

7. Tool of claim 1 with a shoulder free state outside diameter of approximately 0.270/0.272 inch and a shoulder step of approximately 0.015 inch.

8. Tool of claim 7 with a rod head diameter of approximately 0.250 inches, a rod diameter of approximately 0.162/0.165 inches, and a taper of approximately 30°.

9. Tool of claim 8 with an unthreaded tube end length of approximately 1.5 inches 10. Tool of claim 9 with an unthreaded tube end length of approximately 1.5 inches and a base diameter of approximately 0.270 inch.

* * * * *